July 7, 1953   J. H. JACOBS   2,644,159
FACE AND EYE PROTECTIVE SHIELD FOR WELDERS
Filed Sept. 17, 1951   2 Sheets-Sheet 1

INVENTOR.
Joseph H. Jacobs
BY
Williamson & Williamson
ATTORNEYS

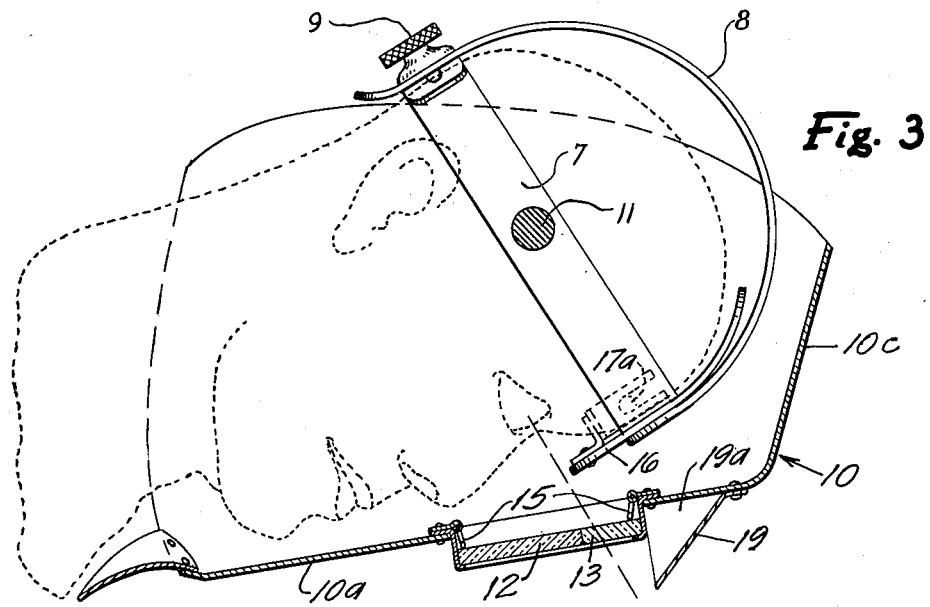
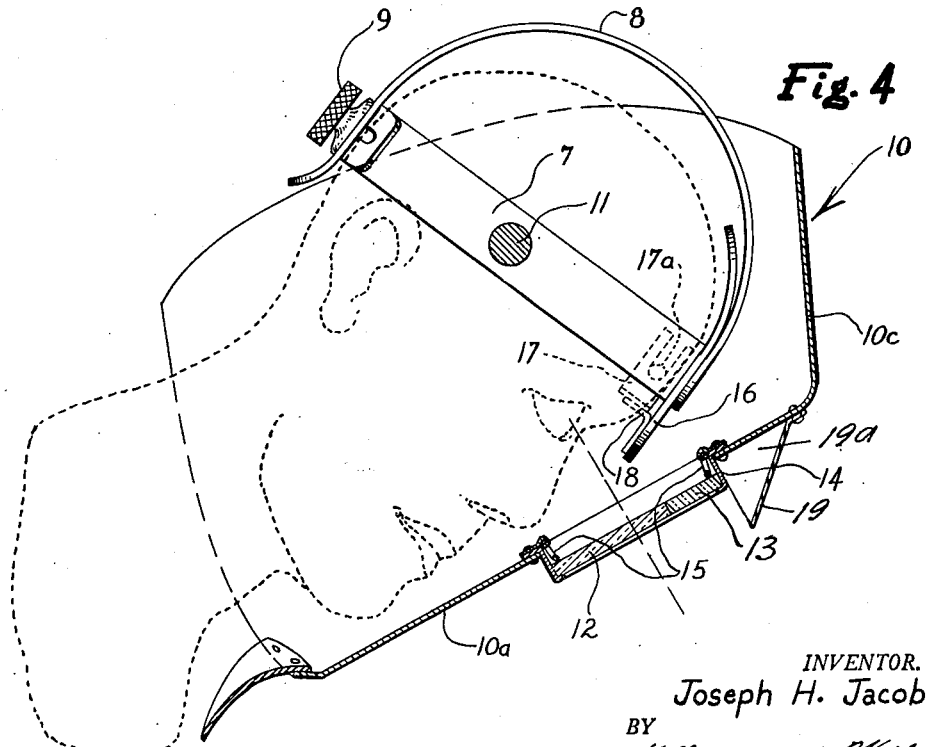

Patented July 7, 1953

2,644,159

UNITED STATES PATENT OFFICE 2,644,159

FACE AND EYE PROTECTIVE SHIELD FOR WELDERS

Joseph H. Jacobs, Minneapolis, Minn., assignor to Jacobs Wind Electric Company, Minneapolis, Minn., a corporation of Montana Application September 17, 1951, Serial No. 246,927

4 Claims. (Cl. 2—8)

This invention relates generally to a protective shield for welders.

In certain instances it is necessary for the welder to obtain an unrestricted view of the work and, with conventional welding shields which are pivotally mounted on the head of the wearer and are provided with only a single highly restrictive protective lens, it is necessary to raise the entire shield portion and expose the entire face and eyes of the wearer to possible injury from the surrounding welders and other workers. One instance where the welder must raise his shield is when positioning the welding rod before striking an arc therewith. When the rod has been properly positioned, a welder wearing a conventional shield must either swing the shield downwardly into protective position with one hand or give a violent nod of the head so that the inertia thus produced will cause the shield to swing downwardly into protective position. In both instances, the position of the welding rod is often shifted relative to the work before the arc is struck and thereby causing the arc to be struck at the wrong place and often damaging the work.

It is an object of my present invention to provide a novel and relatively simple welding shield adapted to permit the welder to obtain an unrestricted view of the work without shifting the shield in any way out of protective position relative to the welder's head and subsequently, by only a slight shifting movement of the head, interpose a light restrictive lens between the eyes of the welder and the arc.

It is a specific object to provide a welder's helmet having a protective lense made in two sections, an upper transparent section permitting normal unrestricted viewing therethrough and a lower highly restrictive section through which only extremely bright and intense light rays are permitted to pass with a substantial reduction in the intensity thereof, said shield being provided with an opaque protective member substantially aligned with said transparent section and disposed in rearwardly spaced relation thereto, to permit the welder to view the work through the transparent lens merely by shifting his head slightly downwardly to produce a line of sight toward the work below the opaque protective member and above the light restrictive lower section.

It is still a further object to provide a welding shield having a head band with a shield element made from opaque material and having a lens opening in the front portion thereof with a light restrictive lens mounted in said opening, said shield element having a transparent portion above said restrictive lens through which normal vision is permitted, said head band having a protective member disposed in rearwardly opposed relation to said transparent portion and spaced rearwardly therefrom to produce a line of sight through said transparent portion when the head of the operator is tilted in one position and through said light restrictive lens when the head is tilted in another position, said opaque protective member receiving the light rays through said transparent portion when the operator is viewing the work through the light restrictive lens.

It is still another object to provide a protective shield for welders and the like having an opaque shield portion with an opening in the front portion thereof and including a highly restrictive lens mounted in a portion of said opening, the other portion of said opening being maintained transparent for normal vision therethrough, a pair of visor elements one on the inside spaced rearwardly from said opening and one on the outside spaced forwardly from said opening affording protection for the welder's forehead and eyes from light rays through the transparent portion of the opening.

These and other objects and advantages of my invention will more fully appear from the following description made in connection with the accompanying drawings wherein like reference characters refer to the same or similar parts throughout the several views and in which:

Fig. 3 is a longitudinal vertical sectional view taken substantially along the line 3—3 of Fig. 1 and showing the operator's head in downwardly tilted work-viewing position preliminary to the welding operation; and Fig. 4 is a similar view to Fig. 3 showing the welder's head in raised operative position.

Figure 1:
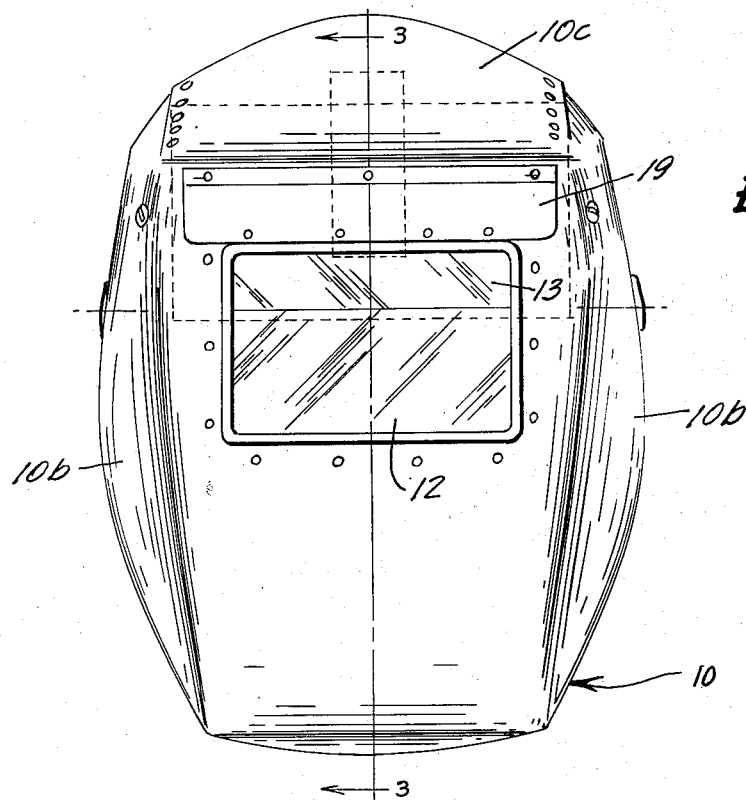
Fig. 1 is a front elevational view of my welding shield.

As illustrated in the accompanying drawings, I provide a head band having an adjustable angular strap 7 with a top-retaining strap 8 extending longitudinally thereof in arched relation from front to rear. An adjustment screw 9 of conventional design is mounted at the rear portion of head-embracing elements 7 and 8. An opaque shield structure, designated as an entirety by the numeral 10, has its side portions hingedly mounted on the side portions of annular head band element 7, as by the pivot pins 11. The shield 10 has a front panel 10a with sides 10b extending rearwardly therefrom and a protective top portion 10c extending rearwardly from the upper extremity thereof to partially enclose the welder's head and protect at least the forward portion thereof. An opening is provided in the front panel 10a of the shield and, in the form shown, a lens formed in two sections is securely mounted in said opening.

A lower highly restrictive lens section 12 extends across the lower portion of said opening and an upper transparent section 13 extends across the upper portion of said opening. The upper lens section 13 may of course be slightly colored but it is important that this section be transparent under normal light to permit viewing of the work before the welding arc is struck. The lens section 12 is substantially opaque under normal lighting conditions and permits only a relatively small amount of light to pass therethrough to permit viewing of the work during the extremely bright illumination of the welding operation. Two lens sections 12 and 13 are joined together along their abutted edge portions and a suitable frame 14 securely interconnects said lens sections around the periphery thereof with the portion of the opaque shield structure surrounding the opening in the front panel thereof. Any suitable means for holding the lens sections in the mounting frame 14 may be provided such as the resilient pressure elements 15.

An inner protective visor member 16 is, in the form shown, mounted on the front portion of the head band element 7 and is made from any suitable opaque sheet material and extends downwardly into opposed relation to at least the upper portion of the eyes of the operator to form an inner visor member 16 disposed in spaced relation between the transparent lens 13 and the upper portion of the operator's eyes but having the lower edge thereof positioned to permit the operator's line of sight to pass therebelow and out through said transparent section 13 when the operator's head is tilted down, as shown in Fig. 3.

Figure 2:
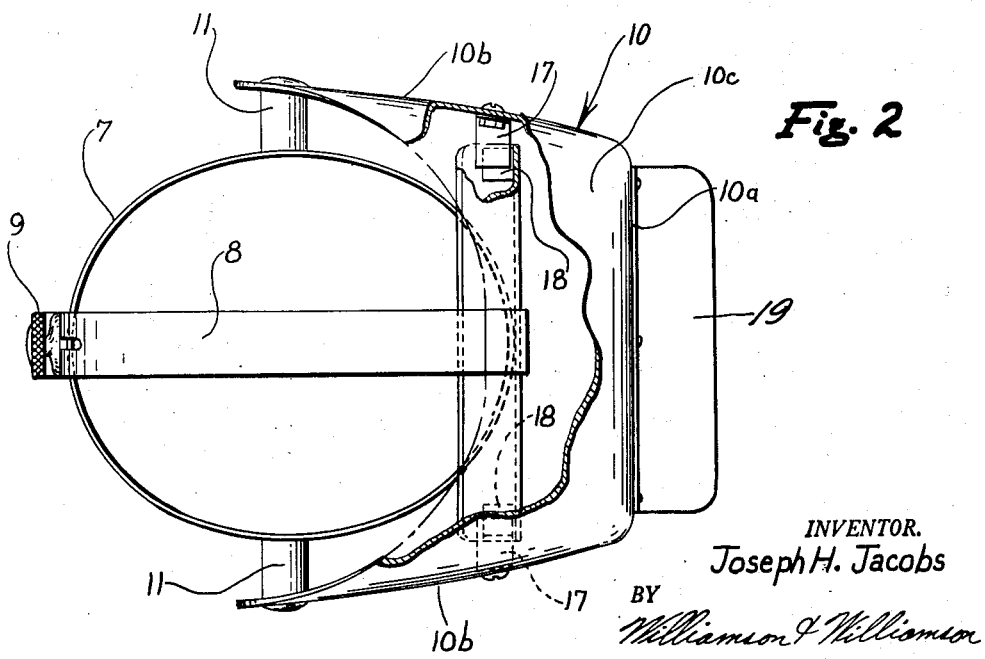
Fig. 2 is a top plan view thereof with a portion of the shield cut away.

A pair of stop brackets 17 are mounted on the forward portion of the sides 10b of the shield 10. Cooperating stops are mounted on the respective side portions of the visor element 16 and are designated by the numeral 18, as best shown in Fig. 2, and respectively engage stops 17 to maintain a predetermined relation between the lenses 12 and 13 and the lower edge portion of the visor 16. The stop brackets 17 have elongated slots 17a formed therein to permit vertical adjustment thereof and facilitate varying the predetermined relation between the lower edge of the visor member 16 and the transparent lens section 13. A second visor 19 is mounted on the outside of the upper portion of the front shield panel 10a and the lower edge thereof is disposed in outwardly spaced relation substantially adjacent the upper edge of the transparent lens 13. In the form shown, the outer visor 19 is securely fixed to said front panel as by being riveted thereto and a pair of end portions 19a close the respective sides of the visor 19.

The following is a description of the operation of my improved welding shield. The shield is mounted on the welder's head in the normal manner and the opaque shield structure 10 is swung downwardly on the pivots 11 into operative protective position with the stops 17 and 18 in engagement, as shown in Figs. 3 and 4. The welder may then, by tilting his head downwardly, as shown in Fig. 3, direct his line of sight below the lower edges of the two visors 16 and 19 and view the work under normal lighting conditions through the transparent lens 13, to facilitate positioning his welding rod in the desired position relative to the work and without varying this position of the rod slowly lift his head into the position shown in Fig. 4 to interpose the light restrictive lens 12 between the welding arc and the eyes of the welder. When the shield 10 has been shifted upwardly with the head of the welder into the position shown in Fig. 4 the protective visor 16 intercepts the rays passing through the transparent lens section 13 and protects the welder's forehead from being burned by these direct high intensity rays due to the welding arc and also combines with visor 19 to afford protection to the welder's eyes from the arcs of other welders.

It will be seen that I have provided a relatively simple yet highly efficient welding shield in which the welder may view the work under normal lighting conditions preliminary to the welding operation to permit positioning of the welding rod prior to striking an arc and thereafter without any violent movement of any portion of the welder's body, such as is necessary with conventional welding shields, the welder merely slowly and easily lifts his head a slight distance to interpose the light restrictive lens 12 between the arc which is then struck and his eyes. In the event that there are a number of welders in close proximity to the operator wearing my improved shield, it will be seen that the shield will fully protect the face and forward head portion as well as the eyes of each welder while permitting viewing of the work before and after the welding operation, thus materially speeding up the replacement of welding rods and materially increasing the protection to the welder. My shield also obviates the necessity of the welder wearing colored glasses to protect his eyes from the arcs of other welders and from flying sparks and hot welding flux and scale chips knocked off from the welding bead with a chipping hammer. My new shield is particularly adapted for use in tack welding where the welder is required to successively strike a number of spaced arcs and is not laying a continuous welding bead.

It will, of course, be understood that various changes may be made in the form, details, arrangement and proportions of the parts without departing from the scope of my invention which, generally stated, consists in the matter shown and described herein and set forth in the appended claims.

What I claim is:

1. A protector for welders comprising a protective shield made from opaque material and having a front portion for protecting the face of a welder, means for pivotally mounting said shield on the head of a wearer with the front portion of the shield disposed in forwardly spaced relation to the wearer's face when said shield is disposed in downwardly swung operative position, said front shield portion having a viewing opening formed therein, a double lens structure mounted in said opening and completely closing the same, one portion of said lens being constructed to restrict the passage of light rays therethrough to permit viewing of a high intensity light source such as a welding arc and forming the lower section of said double lens structure, the upper section of said double lens structure being transparent to permit viewing of the work under normal lighting conditions, and a visor positioned in rearwardly opposed relation to the transparent lens portion with the lower edge of the visor disposed directly inwardly from the lower edge of said transparent lens portion when in operative position and spaced between the upper portion of the wearer's head and said transparent section whereby the welder may tilt his head downwardly to direct his line of sight below the lower edge of said visor and through the transparent section and, by merely tilting his head upwardly, interposed the light restrictive lens between his eyes and the light source to be produced.

2. The structure set forth in claim 1 and said visor being mounted in fixed relation on said head mounting means, and adjustable stop means on said shield and said visor for maintaining a predetermined operative position therebetween.

3. A protector for welders comprising a protective shield made from opaque material and having a front face-protective portion, means for mounting said shield on the head of the wearer with said front shield portion disposed in forwardly spaced relation to the face of the wearer and having an opening therein, a highly restrictive lens mounted in said opening for restricting the passage of light rays therethrough to permit viewing of high intensity light sources, means defining a transparent open portion above said light restrictive lens, for permitting a wearer to direct his line of sight either through said light restrictive lens or said transparent open portion, a visor member made from opaque material and mounted in rearwardly opposed relation to the transparent open portion with the lower edge thereof rearwardly aligned with the lower edge of the transparent portion when in operative position and spaced between the shield and the wearer's head with the lower edge thereof positioned to permit the wearer to tilt his head downwardly and direct his line of sight below said lower edge and through said transparent portion to permit viewing of the work under normal lighting conditions and, by merely raising his head slightly upwardly, interpose the light restrictive lens between his eyes and the light source to be produced.

4. The structure set forth in claim 3 and a second visor member mounted on the outside of said shield with the lower edge thereof disposed in outwardly spaced relation to the upper edge of said transparent open portion to combine with said inner visor and protect the wearer's eyes from the arcs of other welders.

JOSEPH H. JACOBS.

References Cited in the file of this patent

UNITED STATES PATENTS

| Number | Name | Date |
|---|---|---|
| 1,861,797 | Holt | June 7, 1932 |